(12) United States Patent
Bartling et al.

(10) Patent No.: US 8,972,214 B2
(45) Date of Patent: Mar. 3, 2015

(54) TOUCH SENSE DETERMINED BY CHARACTERIZING IMPEDANCE CHANGES IN A TRANSMISSION LINE

(75) Inventors: James S. Bartling, Chandler, AZ (US); Dennis P. Lehman, Garland, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 542 days.

(21) Appl. No.: 13/420,200

(22) Filed: Mar. 14, 2012

(65) Prior Publication Data

US 2012/0271580 A1 Oct. 25, 2012

Related U.S. Application Data

(60) Provisional application No. 61/477,952, filed on Apr. 21, 2011.

(51) Int. Cl.
*G01R 25/00* (2006.01)
*G06F 3/041* (2006.01)

(52) U.S. Cl.
CPC ....................... *G06F 3/041* (2013.01)
USPC ......................................................... 702/65

(58) Field of Classification Search
USPC ......................................................... 702/65
See application file for complete search history.

(56) References Cited

U.S. PATENT DOCUMENTS

| | | | | |
|---|---|---|---|---|
| 6,137,282 | A | 10/2000 | Macke, Sr. et al. | 324/71.1 |
| 7,460,441 | B2 | 12/2008 | Bartling | 368/118 |
| 7,764,213 | B2 | 7/2010 | Bartling et al. | 341/152 |
| 2004/0239616 | A1* | 12/2004 | Collins | 345/156 |
| 2008/0169826 | A1 | 7/2008 | Bartling | 324/658 |
| 2008/0204046 | A1 | 8/2008 | Bartling | 324/658 |
| 2010/0001889 | A1 | 1/2010 | Bartling et al. | 341/122 |
| 2010/0102832 | A1 | 4/2010 | Bartling et al. | 324/679 |
| 2011/0128257 | A1 | 6/2011 | Kim | 345/175 |

FOREIGN PATENT DOCUMENTS

| | | | | |
|---|---|---|---|---|
| EP | 0483519 A1 | 5/1992 | | G01B 7/03 |
| EP | 2000887 A1 | 12/2008 | | G06F 3/023 |
| WO | 2011/137201 A2 | 11/2011 | | G06F 3/041 |

OTHER PUBLICATIONS

International PCT Search Report and Written Opinion, PCT/US2012/033758, 15 pages, Jul. 11, 2012.
Rekimoto, J., "Smartskin: An Infrastructure for Freehand Manipulation on Interactive Surfaces", Interaction Laboratory, Sony Computer Science Laboratories, Inc., 8 pages, Apr. 20, 2002.

(Continued)

*Primary Examiner* — Aditya Bhat
(74) *Attorney, Agent, or Firm* — King & Spalding L.L.P.

(57) ABSTRACT

A touch panel or screen has a serpentine transmission line fabricated on a substrate, e.g., printed circuit board, LCD, plasma or LED screen, etc., and has a constant impedance. Touches to the touch panel will cause changes of impedance of the transmission line at the locations of the touches. Time domain reflectometry (TDR) is used for determining the locations of the changes of impedance of the transmission line by accurately measuring the return pulse times at the source of a plurality of pulses, and then converting the return pulse times to X-Y coordinates of the touch panel or screen.

22 Claims, 12 Drawing Sheets

(56) References Cited

OTHER PUBLICATIONS

International PCT Search Report and Written Opinion, PCT/US2011/034229, 21 pages, Mailed Nov. 3, 2011.

Bohn, Bruce; Microchip Application Note AN1250, "Microchip CTMU for Capacitive Touch Applications", www.microchip.com, Feb. 3, 2009.

* cited by examiner

TOUCH SENSE DETERMINED BY CHARACTERIZING IMPEDANCE CHANGES IN A TRANSMISSION LINE

RELATED PATENT APPLICATION

This application claims priority to commonly owned U.S. Provisional Patent Application Ser. No. 61/477,952; filed Apr. 21, 2011; entitled "Touch Sense Determined by Characterizing Impedance Changes in a Transmission Line," by James S. Baffling and Dennis P. Lehman; which is hereby incorporated by reference herein for all purposes.

TECHNICAL FIELD

The present disclosure relates to touch sense panels and screens, and, more particularly, to sensing locations being touched on the touch sense panel or screen by characterizing impedance changes of a transmission line fabricated on the touch sense panel or screen.

BACKGROUND

Touch sense panels and screens are used in a multitude of applications for user interfacing with consumer appliances, commercial and industrial control panels, etc. A plurality of touch sensors, e.g., capacitive, inductive, resistive, arranged in a matrix may each be individually actuated by placing an object such as a finger over specific areas of the touch sensor matrix. Each of the plurality of touch sensors arranged in the matrix has a defined area of activation and once the touch sensor matrix is design, no variation from its design layout is possible. Also fabrication of the matrix of touch sensors in the panel and supporting electronics thereto can be complicated and expensive.

SUMMARY

Therefore, it is desired to have a touch panel or screen that is both flexible in design and implementation, and low cost to fabricate.

According to an embodiment, a method for sensing touches to a substrate and determining location areas thereof may comprise the steps of: a) providing a sample time reference value; b) discharging any voltage charge on a timing capacitor to substantially zero volts; c) sending a pulse having a voltage amplitude to a first end of a serpentine transmission line fabricated on a substrate comprising a plurality of touch location areas; d) charging the timing capacitor with a constant current source; e) converting the sample time reference value to a sample time reference voltage; f) comparing the sample time reference voltage with a voltage charge on the timing capacitor, wherein if the sample time reference voltage and the voltage charge on the timing capacitor are substantially equal then storing the sample time reference value and a sample of a voltage at the first end of the serpentine transmission line then going to step h), and if the sample time reference voltage and the voltage charge on the timing capacitor are not substantially equal then going to step g); g) determining whether the pulse has ended, wherein if the pulse has ended then returning to step a), and if the pulse has not ended then returning to step f); h) determining whether the sampled voltage at the first end of the serpentine transmission line is less than the voltage amplitude of the pulse, wherein if not less than the voltage amplitude of the pulse then returning to step a), and if less than the voltage amplitude of the pulse then going to step i); and i) converting the stored sample time reference value to a location area on the substrate, then returning to step a).

According to a further embodiment of the method, the step of providing a sample time reference value comprises the step of incrementing the sample time reference value at each instance of the pulse ending. According to a further embodiment of the method, the step of providing a sample time reference value comprises the step of incrementing the sample time reference value at each instance of a start of a new pulse.

According to a further embodiment of the method, additional steps may comprise: alternating between asserting one pulse at the first end of the serpentine transmission line and then asserting a subsequent pulse at the second end of the serpentine transmission line; and storing the voltage sample from the first end of the serpentine transmission line when the pulse is asserted at the first end, and storing a subsequent voltage sample from the second end of the serpentine transmission line when the subsequent pulse is asserted at the second end.

According to a further embodiment of the method, the step of comparing the sample time reference voltage with the voltage charge on the timing capacitor may comprise the step of using a voltage comparator.

According to a further embodiment of the method, the step of determining whether the stored sample voltage at the first end of the serpentine transmission line is less than the voltage amplitude of the pulse may comprise the steps of: converting the stored sample of the voltage at the first end to a digital value with an analog-to-digital converter (ADC); and comparing the digital value to a digital reference value with a digital comparator.

According to a further embodiment of the method, the step of converting the stored sample time reference value to a location area on the substrate that has been touched may comprise the step of retrieving the location area corresponding to the stored sample time reference value with a look-up table having a plurality of sample time reference values and their corresponding location areas. According to a further embodiment of the method, the step of averaging a location area corresponding to the voltage sample from the first end with a location area corresponding to the subsequent voltage sample from the second end improves resolution of location areas touched on the substrate.

According to a further embodiment of the method, additional steps may comprise the steps of: storing a plurality of location areas that have been touched in a memory; and calculating a Gaussian probability distribution of adjacent location areas from the plurality of location areas stored in the memory. According to a further embodiment of the method, additional steps may comprise the steps of: storing a plurality of location areas that have been touched in a memory; and averaging substantially similar location areas from the plurality of location areas stored in the memory. According to a further embodiment of the method, additional steps may comprise the steps of: storing a plurality of location areas that have been touched in a memory; and determining direction and speed of changing location areas from the plurality of location areas stored in the memory.

According to a further embodiment of the method, the substrate may be a touch panel comprising a printed circuit board having the serpentine transmission line on a front printed circuit side thereof, and a back printed circuit side covered with an electrical conductor. According to a further embodiment of the method, the substrate may be a touch screen comprising a light transmissive insulating material having a front side with the serpentine transmission line thereon and a back side covered with a light transmissive electrical conductor.

According to another embodiment, an apparatus for sensing touches to a substrate and determining location areas thereof may comprise: a charge time measurement unit (CTMU) comprising a timing capacitor and a constant current source; a sample time reference source providing a sample time reference value; a digital-to-analog converter (DAC) that converts the sample time reference value to a sample time reference voltage; a voltage comparator having a first input coupled to an output of the DAC and a second input coupled to the timing capacitor of the CTMU; a serpentine transmission line fabricated on a substrate comprising a plurality of touch location areas, the serpentine transmission line having first and second ends and a first voltage sensing node couple to the first end through a first resistor; a pulse generator for generating a pulse at the first end of the serpentine transmission line, the pulse having a voltage amplitude; a sample and hold circuit having an input coupled to the first end of the serpentine transmission line and a sample control input coupled to an output of the voltage comparator; an analog-to-digital converter (ADC) having an input coupled to an output of the sample and hold circuit; and a digital processor with memory, the digital processor is coupled to an output of the ADC; wherein when a pulse from the pulse generator is asserted on the first end of the serpentine transmission line the constant current source is coupled to and starts charging the timing capacitor; wherein when a voltage charge on the timing capacitor is equal to the sample time reference voltage from the sample time reference voltage source, the voltage comparator causes the sample and hold circuit to sample and hold a voltage on the first voltage sensing node of the serpentine transmission line; wherein if the voltage sample taken at the first voltage sensing node of the serpentine transmission line is less than a reference voltage then the digital processor converts the sample time reference value to a location area of the substrate.

According to a further embodiment, a second end of the serpentine transmission line may be terminated with a second resistor. According to a further embodiment, a second end of the serpentine transmission line may not be terminated. According to a further embodiment, a multiplexer has a first input coupled to the first voltage sensing node, a second input coupled to a second voltage sensing node, and an output coupled to the input of the sample and hold circuit. According to a further embodiment, the digital processor may comprise a microcontroller.

According to a further embodiment, the substrate may be a touch panel comprising a printed circuit board having the serpentine transmission line on a front printed circuit side thereof, and a back printed circuit side covered with an electrical conductor. According to a further embodiment, the substrate may be a touch screen comprising a light transmissive insulating material having a front side with the serpentine transmission line thereon and a back side covered with a light transmissive and electrically conductive material. According to a further embodiment, the light transmissive and electrically conductive material may be indium tin oxide (ITO). According to a further embodiment, the touch screen may be located between a graphical display and a field of vision.

BRIEF DESCRIPTION OF THE DRAWINGS

A more complete understanding of the present disclosure may be acquired by referring to the following description taken in conjunction with the accompanying drawings wherein.

Figure 1:
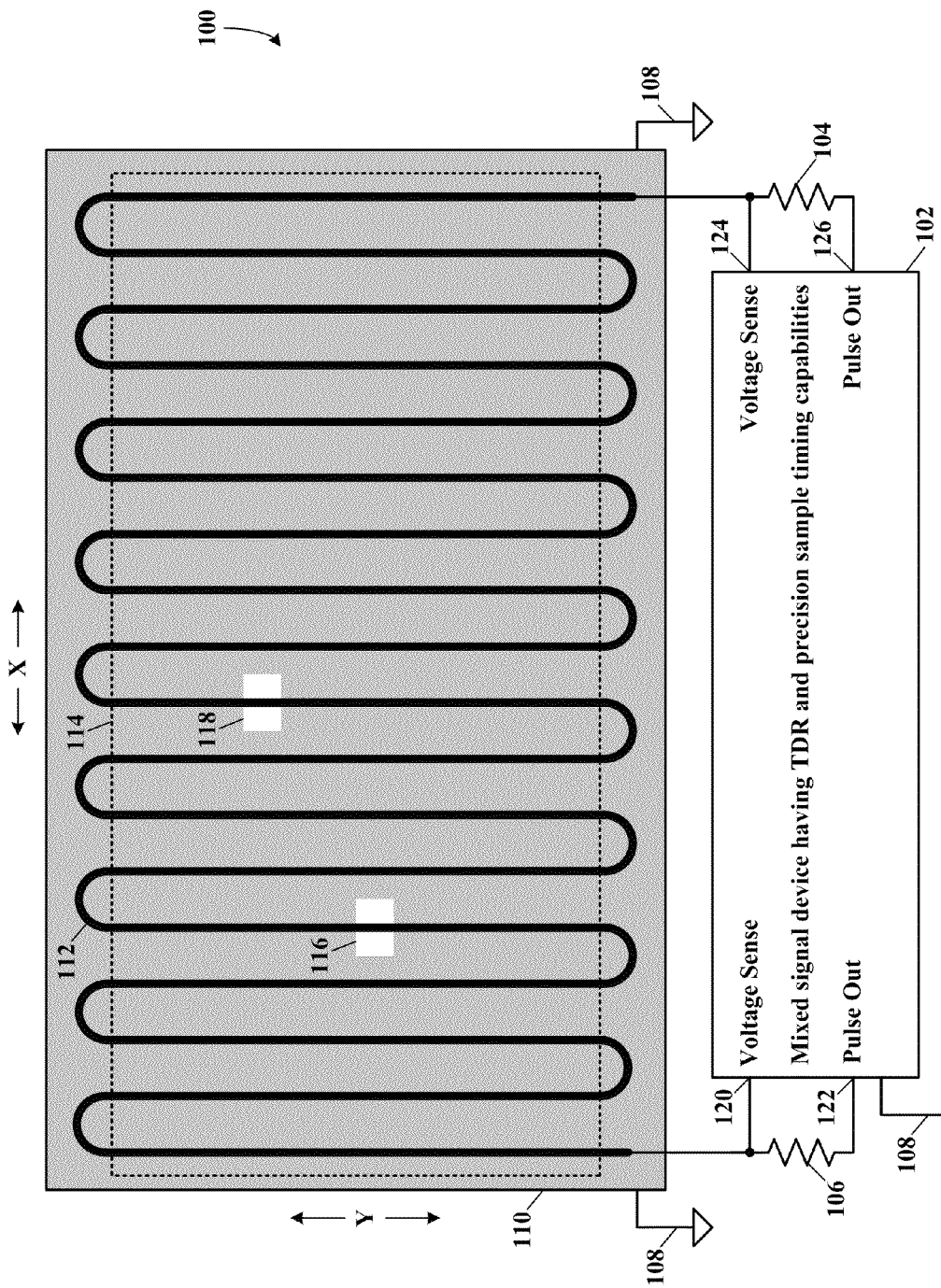
FIG. 1 illustrates a schematic block diagram of a touch panel or screen system, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Time domain reflectometry (TDR) works on a similar principle as radar. A pulse of energy is transmitted down an electrically conductive path (e.g., transmission line) having a constant impedance. When that pulse reaches an un-terminated end of the electrically conductive path, or there is a change of impedance along the electrically conductive path, part or all of the pulse of energy is reflected back to its source. When two metallic conductors are placed in close proximity together, they form a transmission line having a characteristic impedance determined by the spacing of the metallic conductors and the insulating dielectric therebetween.

If the transmission line is terminated in its characteristic impedance there will be no reflected pulse back to the where the pulse originated at the beginning of the transmission line. If the transmission line is un-terminated then there will be a positive reflected pulse back to where the transmitted pulse originated at the beginning of the transmission line. When there is a impedance difference anywhere along the transmission line, there will be a reflected pulse generated and subsequently detected. The time it takes for this reflected pulse to return to the pulse source location is used in determining the distance at which the impedance difference has occurred. An increase in capacitance (e.g., finger touch) along the transmission line will cause the return reflected pulse to be negative with respect to the generated (transmitted) pulse.

When a pulse is sent down a transmission line the voltage at the source may be used to characterize the impedance of the transmission line. By sampling at the pulse source the pulse voltage amplitude versus time, the impedance of the transmission line can be determined and any impedance changes due to a touch to the panel or screen can be located along the transmission line. This provides the ability to detect an unlimited number of simultaneous touches with, for example but is not limited to, a serpentine transmission line fabricated on the touch panel or screen. In addition it can be used over a wide range of material and transmission lines. An advantage of the present invention is detection of an unlimited number of touches at fine resolution on the touch panel or screen.

A TDR circuit may be used to generate the pulses of energy to the transmission line and then determine the time interval between the start of a generated source pulse and detection of a reflected pulse back to the source of the generated pulse. This time interval is then used to determine the distance from the source of the generated pulse to the impedance "bump" causing the reflected pulse. The time interval can be converted into a distance on the electrically conductive path and/or a physical location, e.g., X and Y coordinates of the touch panel. A table lookup and/or calculation may be used for conversion of the time interval to distance and/or physical location on the touch panel or screen.

According to the teachings of this disclosure, a touch panel or screen has a serpentine transmission line fabricated on a substrate, e.g., printed circuit board or light transmissive screen, and has a constant impedance. A touch to the touch panel or screen will cause a change of impedance of the transmission line at the location of the touch. Sampling of voltage at the pulse source (proximate) end of the transmission line at a precise time increment after the start of each of a plurality of pulses applied to the transmission line is used in determining the location(s) of the impedance change(s) of the transmission line caused by the touch(es) (capacitance from finger or object). The touch induced "impedance bump" on the transmission line causes a negative voltage pulse that returns back to the pulse source end of the transmission line at a time interval proportional to the distance of the touch location from the pulse source end of the transmission line. This negative voltage pulse will cause a reduction of the voltage at the pulse source end of the transmission line that when sampled at the precise time of return will define the distance between the touch location and the pulse source end of the transmission line. The time interval (time from the start of the pulse source to the negative voltage return pulse) at which this voltage dip is sampled may then be converted into X-Y coordinates of the touch panel or screen.

The touch panel or screen, or any touch application may be implemented on a substrate with one or more serpentine transmission lines. Using a serpentine transmission line(s) on a substrate for touch sensing lowers the cost of manufacture, greatly simplifies the design of a touch panel since there are no physical limitations as to where and how many touch areas may be implemented, ease of touch position software program implementation, and more reliable and accurate touch sensing then conventional touch sense implementations.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted is a schematic block diagram of a touch panel or screen system, according to the teachings of this disclosure. A touch panel or screen, generally represented by the numeral 100, comprises a substrate 110 having a conductive side and a non-conductive side, a constant impedance serpentine strip line 112 proximate to the non-conductive side of the substrate 110, a mixed signal integrated circuit device 102, a first termination resistor 106 and a second termination resistor 104. For a touch panel, the constant impedance serpentine strip line 112 and substrate 110 may be fabricated from a double sided printed circuit board (PCB) wherein one side of the PCB is a continuous copper foil (connected to a power supply common or ground at node 108) and the other side is copper foil etched into the serpentine stripe line 112 configuration shown in FIG. 1. For a touch screen, a light transmissive insulating material has a front side with the serpentine transmission line 112 (either made of light transmissive material or very thin electrically conductive material that does not substantially block light passing therethrough) thereon and a back side covered with a light transmissive and electrically conductive material, e.g., indium tin oxide (ITO). A liquid crystal display (LCD), a light emitting diode (LED) display, a plasma display, an organic light emitting diode (OLED) display, etc., may be placed behind the aforementioned touch screen for displaying graphics and other visual indications such as pushbuttons, slide switches, gauges, dials, etc.

The serpentine stripe line 112 on the front side and the conductive layer on the back side of the substrate of the touch panel or screen create a constant impedance strip line type of transmission line that when terminated in it's characteristic impedance has no signal reflections, e.g., voltage standing wave ratio (VSWR) 1:1, and when un-terminated has a positive signal reflection substantially equal in amplitude to the generated pulse. The first and second termination resistors 106 and 104 have resistances substantially equal to the characteristic impedance of the serpentine strip line 112. However, when there is an impedance mismatch anywhere along the serpentine strip line 112, a reflected (negative signal) pulse will be returned to the end where the generated (signal) pulse was first applied.

A panel operating area 114 may be divided into plurality of touch areas, e.g., touch areas 116 and 118 are representative of two such touch areas. When an object (not shown), e.g., a finger, is placed in close proximity to a touch area, that portion of the strip line 112 located in the affected touch area will change impedance. Now there is an impedance "bump" that causes a reflected pulse that returns back to the generated pulse source. By knowing the time at which the reflected pulse arrives back at the pulse source (based upon from the time at which the pulse at the source starts), the length (distance) of the serpentine stripe line 112 from the pulse signal source to the panel operating area 114 being touched can be determined.

Figure 2:
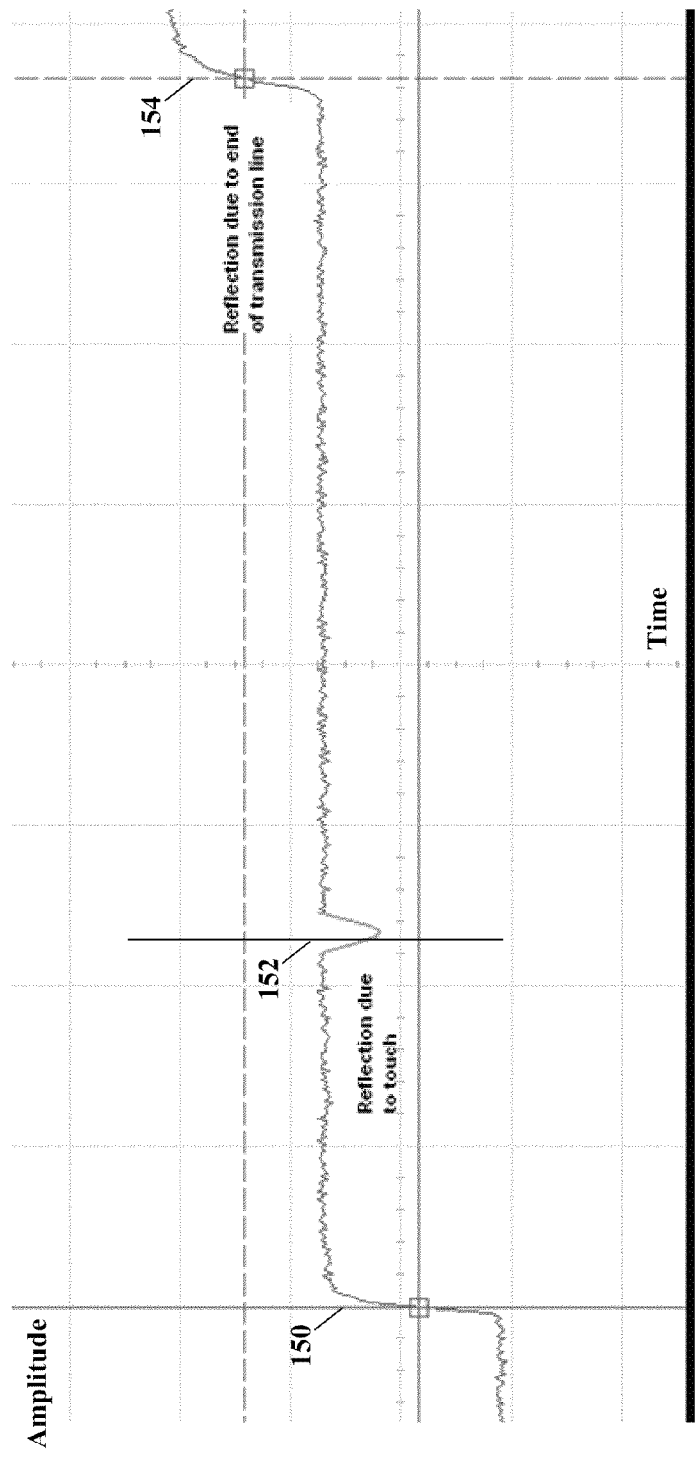
FIG. 2 illustrates a schematic graph showing voltage amplitude versus time of a pulse waveform of a touch panel or screen system as shown in FIG. 1, according to the teachings of this disclosure.

Referring to FIG. 2, depicted is a schematic graph showing voltage amplitude versus time of a pulse waveform of a touch panel or screen system as shown in FIG. 1, according to the teachings of this disclosure. The mixed signal integrated circuit device 102 generates a pulse at node 122 (FIG. 1) having an amplitude of approximately $V_{DD}$ and pulse time duration of at least twice the propagation time of the serpentine stripe line 112. Since resistor 106 has substantially the same resistance as the characteristic impedance of the serpentine stripe line 112, the pulse at node 120 will rise to $V_{DD}/2$ at time 150. A return pulse caused by a touch to the panel operating area 114 has a negative amplitude and appears at time 152. The generated pulse returning from the open (un-terminated) end of the serpentine stripe line 112 (e.g., in FIG. 1 nodes 124 and 126 are both at a high impedance) will have a positive amplitude, e.g., approximately $V_{DD}/2$, at time 154 and will add to the originally generated pulse amplitude ($V_{DD}/2$), resulting in a more positive amplitude e.g., approximately $V_{DD}$, at time 154. By detecting voltage amplitude changes at times 150 and 152 of the node 120, the touched area may be determined. Note at time 150 a positive voltage pulse at node 120 goes to an amplitude of approximately $V_{DD}/2$, at time 152 a negative return pulse causes the voltage at node 120 to have an amplitude of less than $V_{DD}/2$, and at time 154 a positive return pulse causes the voltage at node 120 to have an amplitude of approximately $V_{DD}$ (when the distal end of the serpentine stripe line 112 is open). The voltage amplitude determination at time 154 is not necessary for determining the touch area on the touch panel or screen. The voltage amplitude determination at time 154 may be used to determine the total length of the serpentine stripe line 112, and/or when to end a TDR pulse time duration, e.g., when applied to an unknown length serpentine stripe line 112. When the distal end of the serpentine stripe line 112 is terminated in its characteristic impedance there will be no positive reflected plus whatsoever at time 154.

Figure 3:
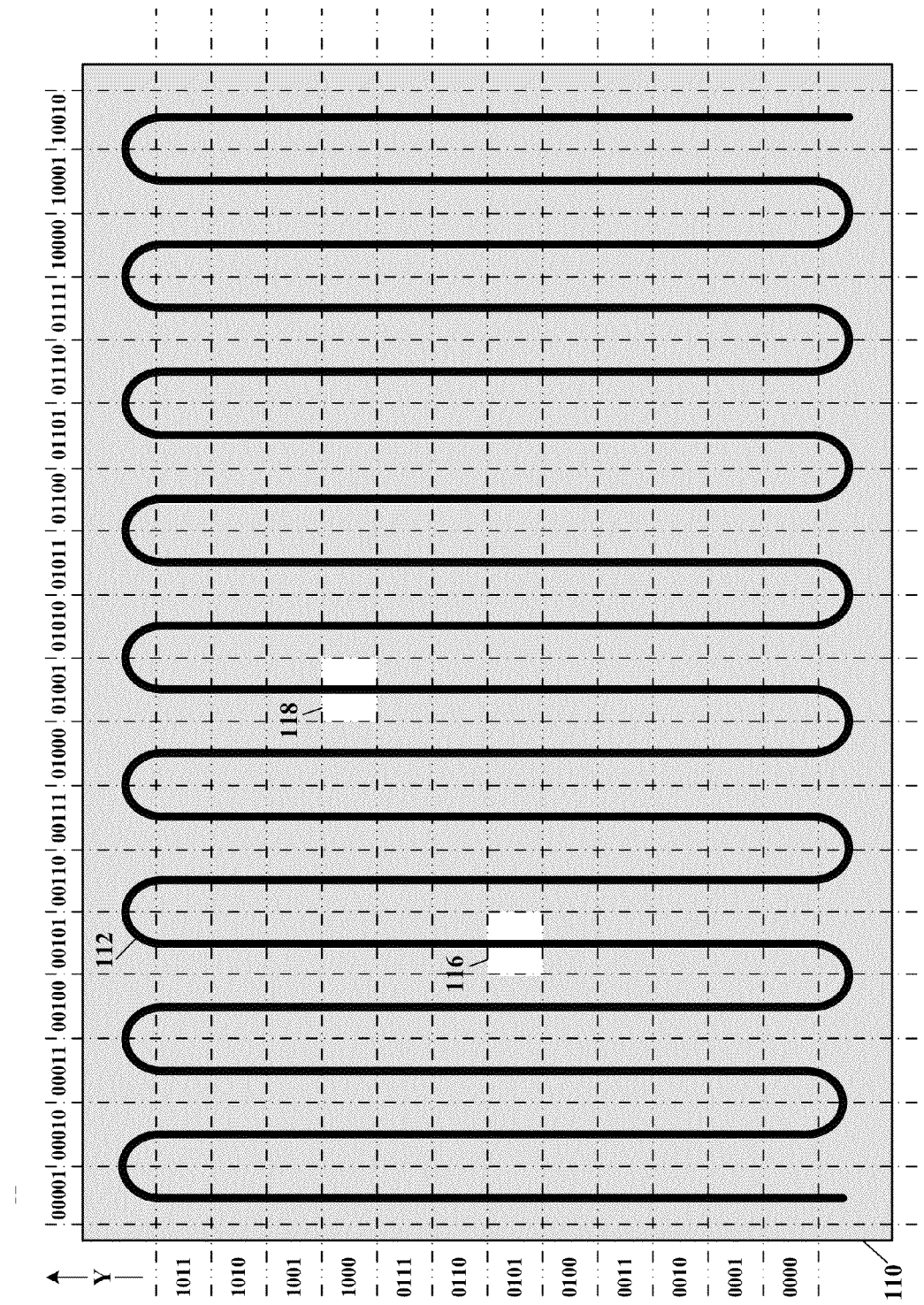
FIG. 3 illustrates a schematic diagram of touch areas of the touch panel or screen as shown in FIG. 1, according to a specific example embodiment of this disclosure.

Referring to FIG. 3, depicted is a schematic diagram of touch areas of the touch panel or screen as shown in FIG. 1, according to a specific example embodiment of this disclosure. The touch areas, e.g., touch areas 116 and 118, are arranged in an X-Y matrix. Binary numbers are shown for each row (Y-axis) and each column (X-axis) for example explanation purposes. The touch area 116 has a location of Y=0101 and X=00101, and the touch area 118 has a location of Y=1000 and X=01001. Both of these touch areas 116 and 118 correspond to different specific propagation times on the serpentine strip line 112. A feature of the present invention is to accurately and precisely measure specific propagation times when a negative pulse occurs due to a touch on the associated touch area of the touch panel or screen, as more fully described hereinafter.

Figure 4:
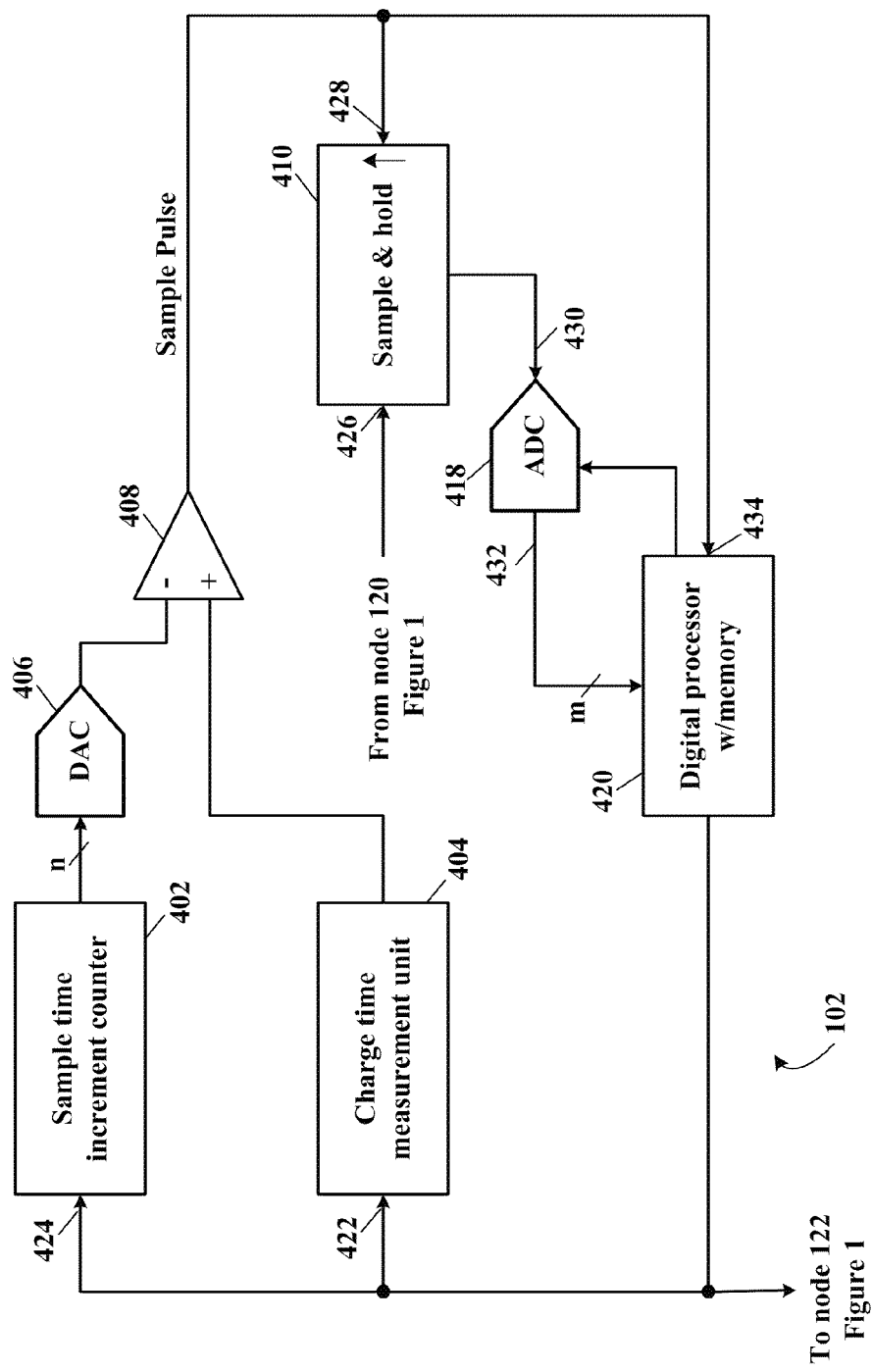
FIG. 4 illustrates a schematic block diagram of a mixed signal integrated circuit device of the touch panel or screen system as shown in FIG. 1, according to a specific example embodiment of this disclosure.

Referring to FIG. 4, depicted is a schematic block diagram of a mixed signal integrated circuit device of the touch panel or screen system as shown in FIG. 1, according to a specific example embodiment of this disclosure. The mixed signal integrated circuit device 102 may comprise a sample time increment counter 402, a charge time measurement unit (CTMU) 404, a digital-to-analog converter (DAC) 406, a voltage comparator 408, a high speed sample and hold 410, an analog-to-digital converter (ADC) 418, and a digital processor with memory 420.

Figure 6:
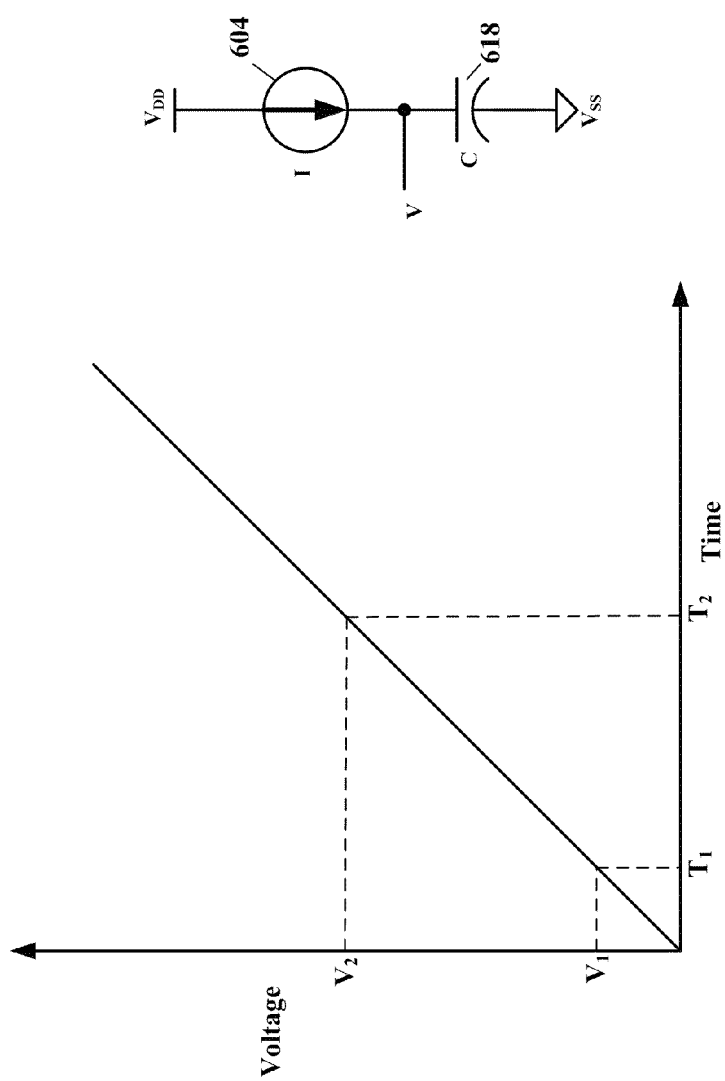
FIG. 6 illustrates a time-voltage graph of a capacitor being charged from a constant current source.

The function of the CTMU 404 may better be understood by referring to FIG. 6, wherein a time-voltage graph of a capacitor being charged from a constant current source is depicted. When a capacitor 618 is charged through a constant current source 604, the voltage, V, across the capacitor 618 increases linearly with time, according to equation (1):

$$I=C*dV/dT \qquad \text{Eq. (1)}$$

where C is the capacitance value of the capacitor 618, I is the current from the constant current source 604 and V is the voltage on the capacitor 618 at time T. When any two values of the current, I; time, T; and voltage, V are known, the other unknown value may be calculated from the two known values. For example, if the capacitance of the capacitor 618 and the charging current from the constant current source 604 are known, then the time $T_1$ at voltage $V_1$ and the time $T_2$ at voltage $V_2$ may be determined using equation (1) above.

When a logic level at node 122 goes from a logic low ("0") to a logic high ("1") the sample time increment counter 402 will increment by one (1) and the CTMU 404, a precision time measurement module, will be enabled to begin precise timing by charging a known value capacitor 618 with a constant current source 604 that results in linearly increasing voltage charge values on the capacitor 618 that are proportional to a respective plurality of elapse times. When the node 122 goes back to a logic low ("0") the CTMU 404 is reset back to zero voltage charge. Each of these elapse times represents the time it would take for a pulse to go to and from a respective distance between the source node 120 and the area touched along the serpentine stripe line 112. These elapse times may be used in determining at which area location(s) of the touch panel or screen 110 was (were) touched based upon the propagation delay time through the length of the serpentine stripe line 112. However, a look-up table may be constructed (calibrated and correlated with the area locations) and saved in the memory of the digital processor 420 that correlates each different voltage charge value to a respective area location on the touch panel or screen 110. The digital processor 420 may be used to generate a plurality of pulses having high and low logic levels to node 122. The digital processor 420 may be, for example but is not limited to, a microcontroller, a microprocessor, a digital signal processor (DSP), a programmable logic array (PLA), an application specific integrated circuit (ASIC), etc. The memory of the digital processor 420 may be volatile and/or non-volatile memory.

The CTMU is more fully described in Microchip application notes AN1250 and AN1375, available at www.microchip.com, and commonly owned U.S. Pat. No. 7,460,441 B2, entitled "Measuring a long time period;" and U.S. Pat. No. 7,764,213 B2, entitled "Current-time digital-to-analog converter," both by James E. Baffling; wherein all are hereby incorporated by reference herein for all purposes.

The DAC 406 provides an analog voltage reference value to a negative input of the voltage comparator 408, and the voltage charge on the capacitor 618 of the CTMU 404 is coupled to a positive input of the voltage comparator 408. A count value output from the sample time increment counter 402 is coupled to digital inputs of the DAC 406, and the DAC 406 provides at its output a respective analog voltage therefrom. When the timing voltage charge from the CTMU 404 is equal to or greater than the voltage from the DAC 406, the output of the voltage comparator 408 will go to a logic high ("1") and is applied to input 428 of the sample and hold 410. The input 428 of the sample and hold is positive edge triggered (↑). The positive edge trigger (↑) at the input 428 will cause the sample and hold 410 to take a sample (at its sample input 426) of a voltage at node 120 at the time at which the positive edge of the sample pulse occurs.

The sample and hold 410 holds a voltage sample of the node 120 in a sample capacitor (not shown) so that the ADC 418 can read and convert it to a digital representation thereof. When a logic high ("1") is asserted at input 434 of the processor 420, the digital processor 420 may be initialized to perform an interrupt routine that reads the digital representation of the voltage sample at the digital output 432 of the ADC 418. The digital processor 420 may also read the output from the ADC 418 any other way known to those skilled in digital circuit design and having the benefit of this disclosure.

Pulses at node 122 are repeatedly generated by the processor 420. Each time a pulse at node 122 starts e.g., positive edge trigger, the CTMU 404 timing circuit is reset (timing capacitor reset to zero volts) and the sample time increment counter 402 count value increments by one count. The number of different count values provided from the sample time increment counter 402 is determined by the resolution desired and/or possible, based upon the resolutions of the DAC 406, the sample and hold 410 and the ADC 418. The timing capacitor 618 and constant current charging source 604 are analog circuits and therefore have substantially infinite resolution, but temperature, voltage changes and component aging do limit absolute resolution repeatability. This analog component "drift" can be compensated for in many ways, e.g., the touch system can be recalibrated when necessary or desired.

There may be multiple locations being touched that will return multiple negative pulses but only the touch corresponding to the present count value in the sample time increment counter 402 is of interest. The pulse repetition rate is much faster than any touch movement or change, therefore, multiple touches and/or touch movements, e.g., gesturing, will easily be recognized during a plurality of pulses as the count value in the sample time increment counter 402 increments from 1 to N. One or more count values of the sample time increment counter 402 may be associated with, e.g., represent, each area location of the touch panel or screen 100. Allowing only one voltage charge (timing) sample to be taken per positive edge (when output goes from a logic low to a logic high) from the output of the comparator 408, e.g., taking one voltage sample "snapshot," gives the ADC 418 and digital processor 420 adequate time to do the analog-to-digital conversion and touch location determination, respectively.

The circuit shown in FIG. 4 will take only one voltage sample within a pulse time if a negative return pulse is detected at node 120 during that pulse time, however, further savings in circuit modules and complexity may be achieved by taking one sample per pulse time at each time match, but only storing the sample time voltage (area of touch location) when a voltage sample at node 120 indicates that a return negative pulse had returned thereto at that sample time.

Figure 5:
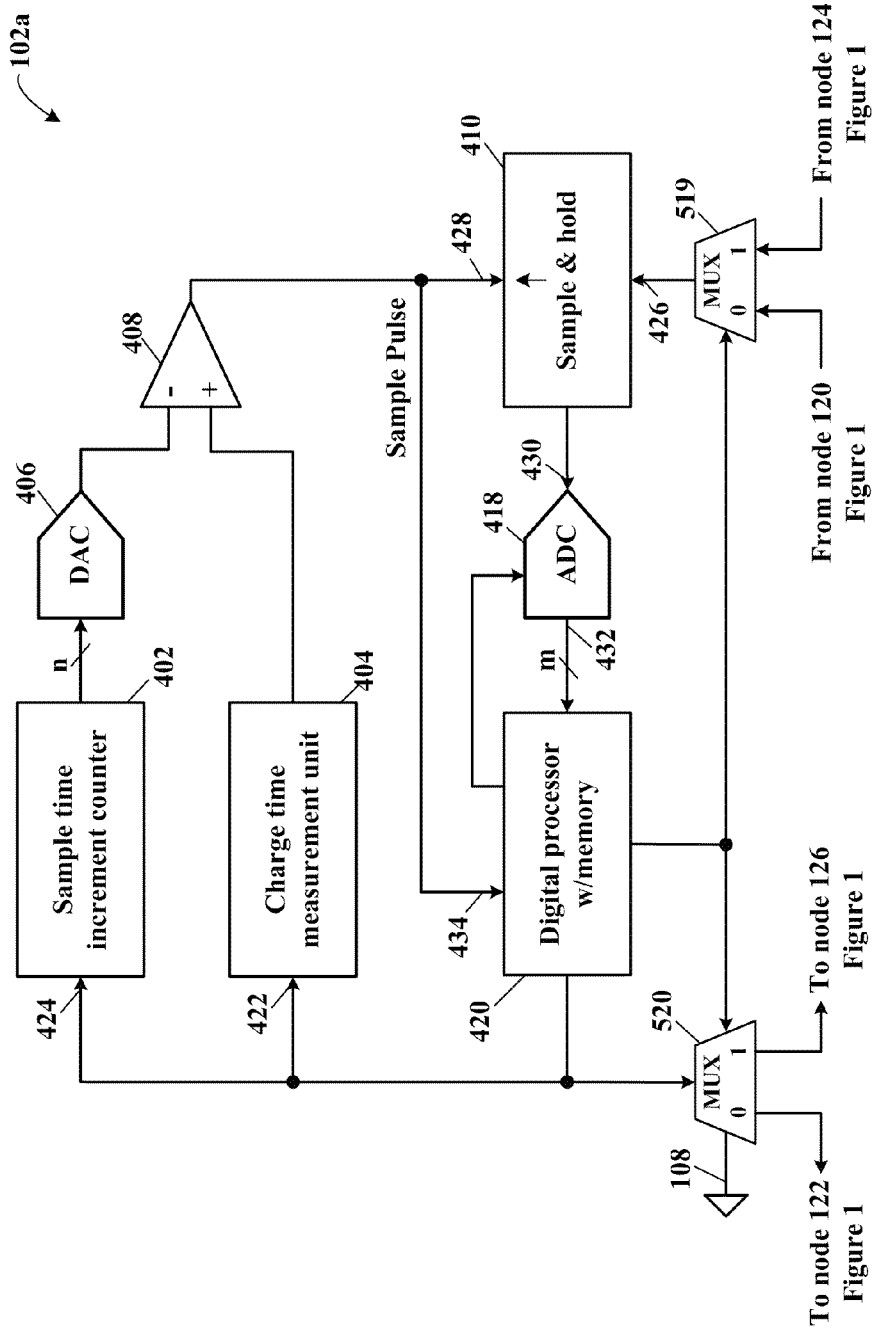
FIG. 5 illustrates a schematic block diagram of a mixed signal integrated circuit device of the touch panel or screen system as shown in FIG. 1, according to another specific example embodiment of this disclosure.

Referring now to FIG. 5, depicted is a schematic block diagram of a mixed signal integrated circuit device of the touch panel or screen system as shown in FIG. 1, according to another specific example embodiment of this disclosure. The mixed signal integrated circuit device 102a may comprise a sample time increment counter 402, a charge time measurement unit (CTMU) 404, a digital-to-analog converter (DAC) 406, a voltage comparator 408, a high speed sample and hold 410, an analog-to-digital converter (ADC) 418, multiplexers 519 and 520, and a digital processor with memory 420. The sample and hold 410 may be combined with or as the multiplexer 519, and that may also be an integral part of the ADC 418.

Operation of the TDR circuit shown in FIG. 5 takes a voltage sample at node 120 when the voltage charge value from the CTMU 404 matches the reference voltage from the DAC 406 (sample time). The node 120 voltage sample is converted into digital representations by the ADC 418. Since there is plenty of time during the pulse off time period, the voltage sample may be converted and evaluated at low power speeds. The digital processor 420 can then evaluate the digital representation by, for example but not limited to, first evaluating the node 120 voltage sample and if this sample is less than $V_{DD}/2$ then converting the sampled charge voltage value (representing travel time of the negative pulse) into a touched location and storing the touched location for further use in the memory of the digital processor 420.

The multiplexer 519 selects either node 120 or 122 for monitoring a return pulse at the respective node 120 or 122. The digital processor 420 also drives either the node 122 or the node 126 through the switch multiplexer 520. The multiplexers 519 and 520 are controlled by the digital processor 420. When driving node 122, node 126 remains at a logic low ("0"), and when driving node 126, node 122 remains at a logic low ("0"). Therefore the serpentine strip line 112 always remains terminated in its characteristic impedance so that only return (reflected) pulses will be created by touched location areas of the touch panel or screen 110.

By storing a plurality of touched locations, a pattern of the touch locations will become apparent. Also by over sampling and storing the touched locations, decimating, averaging and/or smoothing of the samples will yield more accurate and precise touched locations. Digital signal processing such as, for example but not limited to, Viterbi processing may further be used to improve accuracy under noisy conditions.

Figure 7:
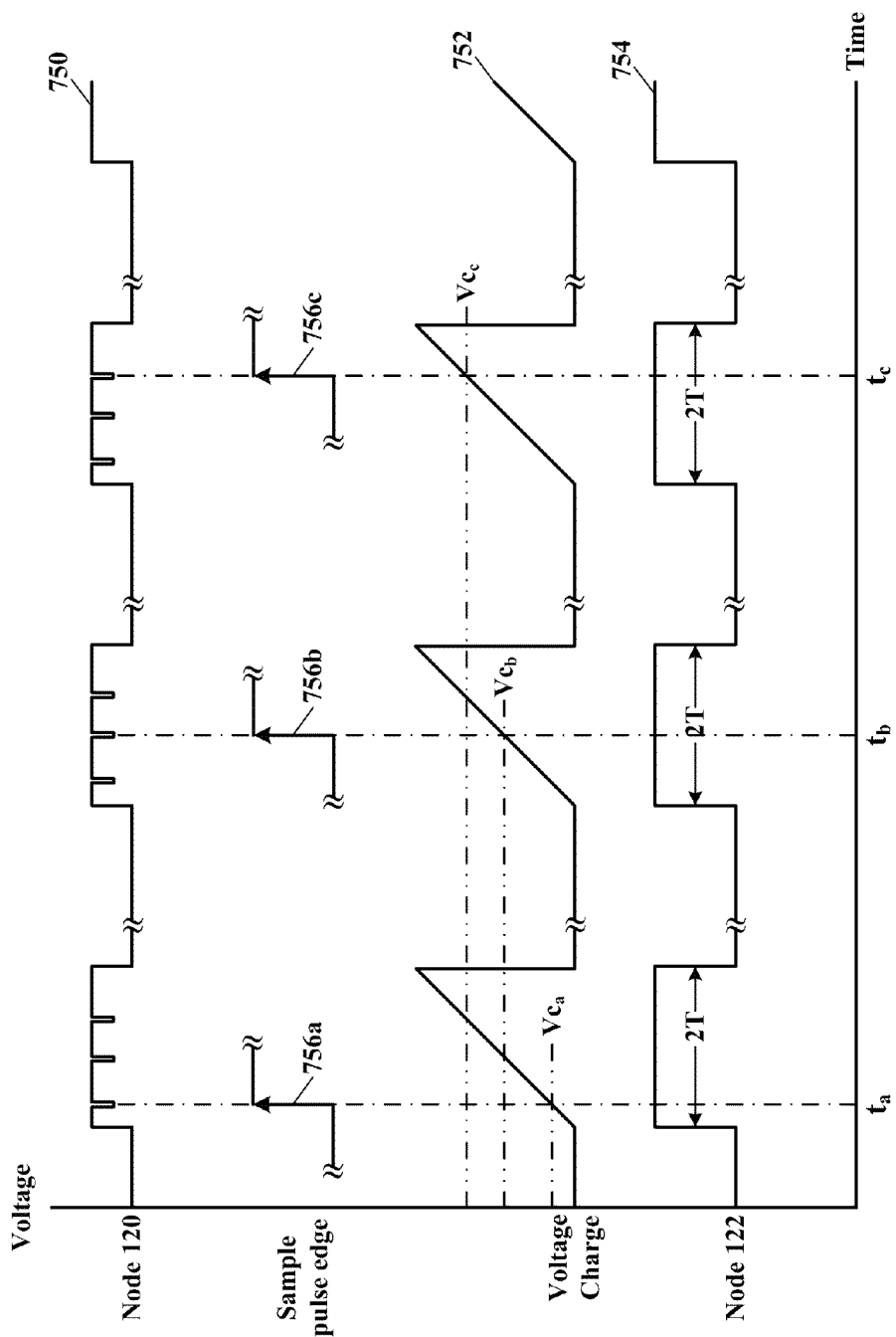
FIG. 7 illustrates time-voltage graphs of source pulses, return pulses, sample pulses and charge voltages in relation to the source and return pulses of a capacitor being charged from a constant current source of the mixed signal integrated circuit devices shown in FIGS. 4, 5 and 8, according to the teachings of this disclosure.
Figure 8:
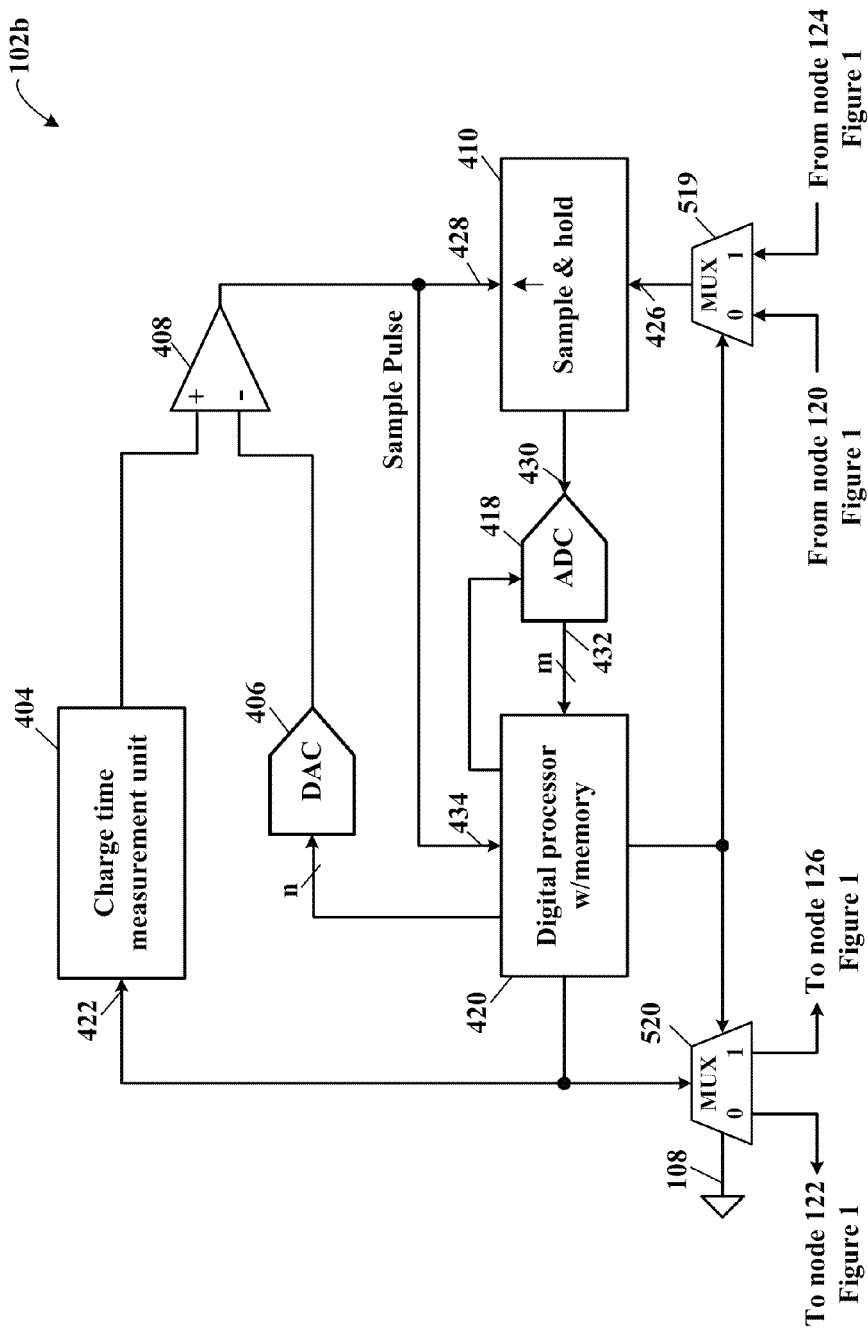
FIG. 8 illustrates a schematic block diagram of a mixed signal integrated circuit device of the touch panel or screen system as shown in FIG. 1, according to yet another specific example embodiment of this disclosure.

Referring to FIG. 7, depicted are time-voltage graphs of source pulses, return pulses, sample pulses and charge voltages in relation to the source and return pulses of a capacitor being charged from a constant current source of the mixed signal integrated circuit devices shown in FIGS. 4, 5 and 8, according to the teachings of this disclosure. Voltage waveform 750 graphically represents the voltage amplitudes at node 120 showing various negative return pulses, voltage waveform 752 graphically represents the time linear increasing voltage charge on the timing capacitor 618, voltage waveform 754 graphically represents the source pulse voltage at node 122, and voltage waveforms 756 graphically represents sample pulse edges of a plurality of sample pulses indicating different time slots taken over a plurality of pulses generated at node 122. For explanatory purposes, shown are segment of these waveforms that are not contiguous. Negative return pulses are indicated at times $t_a$, $t_b$, and $t_c$ (relative to the start of each the respective 2 T source pulse at node 122). Each of these negative return pulses represent touches at different location areas of the touch panel or screen 110. As indicated, each sample of the voltage at node 120 is taken when the voltage charge value on the timing capacitor 618 is at $Vc_a$, $Vc_b$ and $Vc_c$, respectively. When each of the negative return pulses have been detected at the respective times $t_a$, $t_b$, and $t_c$, the digital processor 420 uses these voltage charge values $Vc_a$, $Vc_b$ and $Vc_c$, respectively, to determine the location areas of the touch panel or screen 110 that were touched.

Referring to FIG. 8, depicted is a schematic block diagram of a mixed signal integrated circuit device of the touch panel or screen system as shown in FIG. 1, according to yet another specific example embodiment of this disclosure. Operation of the TDR circuit shown in FIG. 8 is similar to the circuit of FIG. 5 except that the sample time increment counter 402 has been eliminated and the digital processor 420 provides the digital input values directly to the DAC 406. Since the digital processor 420 provides the source pulses to node 122, it can also increment an internal counter to define at what charge voltage (times) samples will be taken at node 120. Alternatively, the digital processor 420 can generate non-sequential (non-contiguous) digital input values to the DAC 406. This is useful when location areas of interest can be defined on the touch panel or screen, and/or used with over sampling, sample averaging, DSP estimation algorithms, e.g., Viterbi, etc. In addition, by limiting time sample acquisitions to those location areas of interest, further power savings may result. Updating of the digital input values are not time critical since this updating would normally be done when node 122 was at a logic zero (during the conversion of the sampled charge voltage value to a location area).

The voltage charge value sample representing the designated sample time and the node 120 voltage sample are both converted into digital representations by the ADC 418. Since there is plenty of time during the pulse off time period (node 122 at logic low ("0")), these two voltage samples may be converted and evaluated sequentially at low power speeds. The digital processor 420 can then evaluate the two digital representations by, for example but not limited to, first evaluating the node 120 voltage sample and if this sample is less than $V_{DD}/2$ then converting the sampled charge voltage value (representing travel time of the negative pulse) into a touched location and storing the touched location for further use in the memory of the digital processor 420.

It is contemplated and within the scope of this disclosure that the pulses may be applied alternatively to node 122 and then a subsequent pulse be applied to node 126. Thus alternating (ping-pong) pulses may effectively improve touch resolution. Then touch negative return pulses from each of the alternate pulse source locations (nodes 122 and 126) can be averaged for a more exact determination of the area being touched. Multiple samples may also be averaged to refine determination of a touch location(s). Thus multiple and/or alternating (ping-pong) pulses may effectively improve touch location resolution.

To do the aforementioned alternating (ping-pong) pulses, the multiplexer 519 selects either node 120 or 122 for monitoring a return pulse at the respective node 120 or 122. The digital processor 420 also drives either the node 122 or the node 126 through the switch multiplexer 520. The multiplexers 519 and 520 are controlled by the digital processor 420. When driving node 122, node 126 remains at a logic low ("0"), and when driving node 126, node 122 remains at a logic low ("0"). Therefore the serpentine strip line 112 always remains terminated in its characteristic impedance so that only return (reflected) pulses will be created by touched location areas of the touch panel or screen 110.

Figure 9:
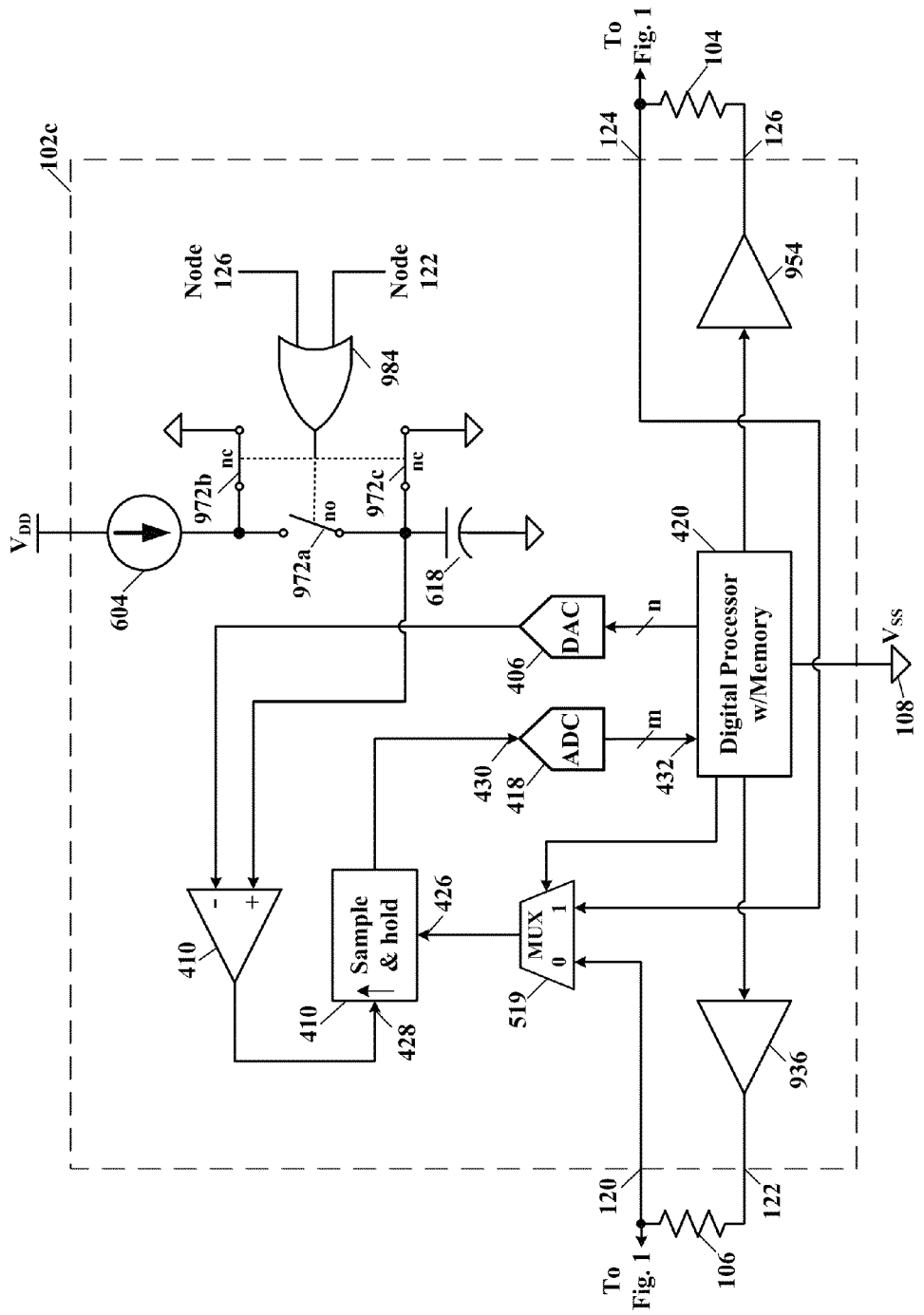
FIG. 9 illustrates a schematic block diagram of a mixed signal integrated circuit device capable of interleaving TDR sampling from each end of the transmission line of the touch panel or screen system, according to another specific example embodiment of this disclosure.

Referring to FIG. 9, depicted is a schematic block diagram of a mixed signal integrated circuit device capable of interleaving TDR sampling from each end of the transmission line of the touch panel or screen system, according to another specific example embodiment of this disclosure. The mixed signal integrated circuit device 102c comprises substantially the same elements as the device 102b shown in FIG. 8, and in addition, elements for alternately driving and sampling each node 122 and 126, as described hereinabove, are provided in the circuit shown in FIG. 9. A portion of the CTMU 404 comprises a constant current source 604, a timing charge capacitor 618 and current steering switches 972. An OR gate 984 has a first input coupled to node 122 and a second input coupled to node 126. When there is a logic high ("1") on either of the nodes 122 or 126 an output of the OR gate 984 will go to a logic high ("1") whereby switch 972a closes and switches 972b and 972c open.

When switches 972b and 972c are closed and switch 972a is open the voltage charge on capacitor 618 is at zero volts. When switch 972a closes and switches 972b and 972c open the constant current source 604 begins charging the timing capacitor 618. The multiplexer 519 selects either node 120 or 122 for monitoring a return pulse at the respective node 120 or 122. The multiplexer 519 is controlled by the digital processor 420. The digital processor 420 also drives either the node 122 or the node 126 through drivers 936 or 954, respectively. When driving node 122, node 126 remains at a logic low ("0"), and when driving node 126, node 122 remains at a logic low ("0"). Therefore the serpentine strip line 112 always remains terminated in its characteristic impedance so that only return (reflected) pulses will be created by touched location areas of the touch panel or screen 110.

It is contemplated and within the scope of this disclosure that dead times may be introduced between assertions of source pulses at nodes 122 and 126 to allow enough house keeping time for analog-to-digital conversions of the sampled charge voltage value and the voltage samples from nodes 120 and 124. Additional sample and holds may be utilized for sampling and holding voltage values from nodes 120 and 124. When source pulses are alternating between nodes 122 and 126, a single shared sample and hold 410 for voltage values at nodes 120 and 124 may not be sufficient depending upon the latency, conversion and computation times of the ADC 418 and digital processor 420.

Figure 10:
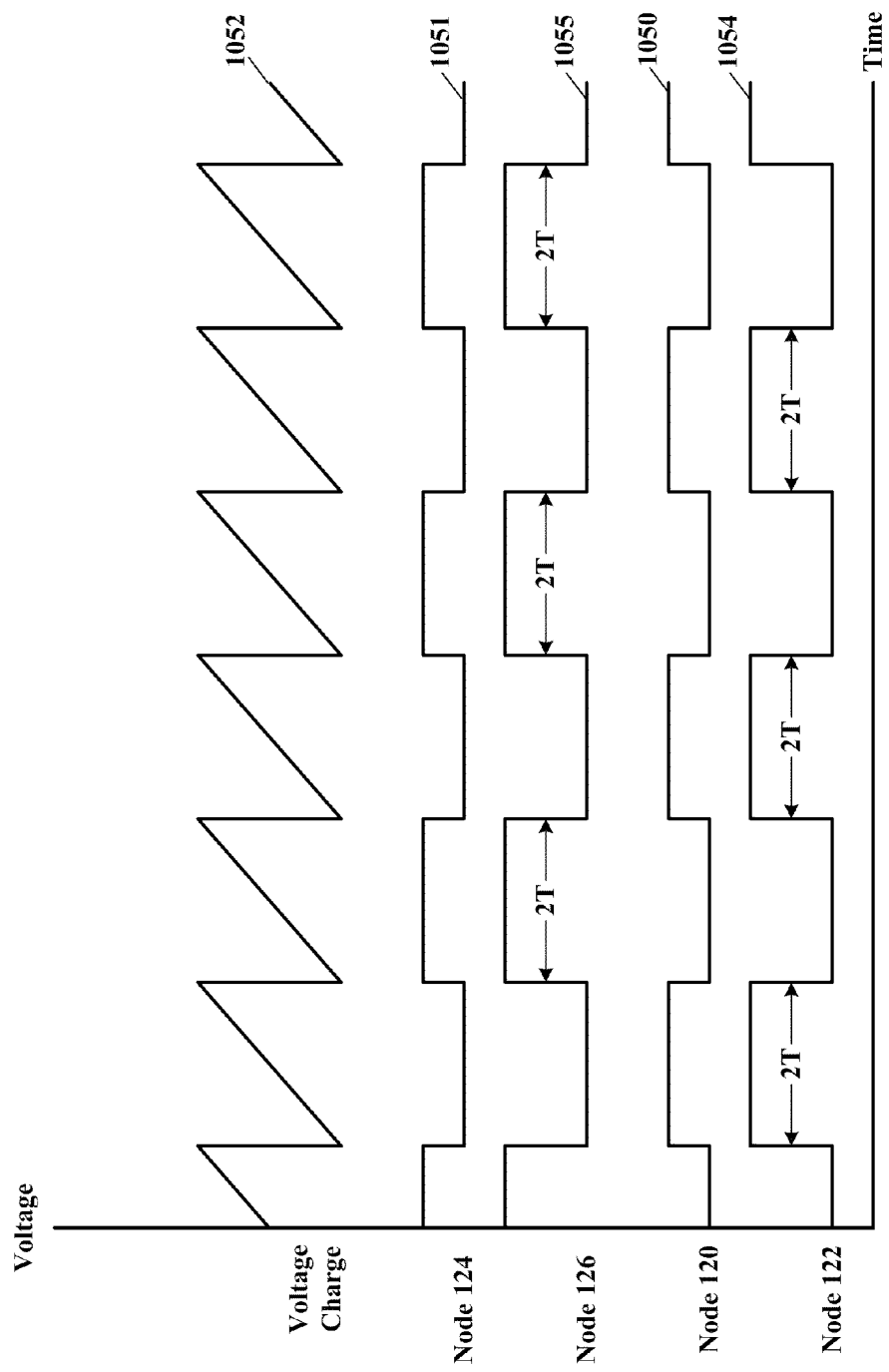
FIG. 10 illustrates time-voltage graphs of alternating source pulses, return pulses and charge voltages in relation to the source and return pulses of a capacitor being charged from a constant current source of the mixed signal integrated circuit device shown in FIG. 9, according to the teachings of this disclosure.

Referring to FIG. 10, depicted are time-voltage graphs of alternating source pulses, return pulses and charge voltages in relation to the source and return pulses of a capacitor being charged from a constant current source of the mixed signal integrated circuit device shown in FIG. 9, according to the teachings of this disclosure. Voltage waveforms 1050, 1054, 1051 and 1055 graphically represent the voltage amplitudes at nodes 120, 122, 124 and 126, respectively. Voltage waveform 1052 graphically represents the time linear increasing voltage charge on the timing capacitor 618. Alternating source pulse driving between nodes 122 and 126 allows twice as many voltage samples to taken and at opposite ends of the serpentine strip line 112. This technique may be used to increase voltage sampling rates and for improving the resolution of a touched location area by averaging the touch voltage charge values from both ends of the serpentine strip line 112. Preferably, the source pulse time is at least twice the propagation time (2 T) of the serpentine strip line 112.

The pulse repetition rate of the TDR touched area location technique described herein is much faster than the contact and/or movement of an object(s) (finger(s)) touching the touch panel or screen. Therefore a number of detected touched area locations of substantially the same touch incident may be saved in a memory of the digital processor 420 and used to further refine determination of the touched location areas. In addition, the location area resolution may be much finer than the area of the touching object (fat finger), therefore, more than one touched location area will be detected for that touch incident. Statistical analysis may be used to refine detection of the touched location areas as well as direction and speed of touch motion, e.g., gesturing. Gaussian probability analysis, and/or other statistical analysis methods may be employed as well as over sampling and decimation techniques in refining and better defining touched location areas, motion, direction and patterns thereof.

Advantages to utilizing TDR with a CTMU in combination with a sample and hold circuit(s) as disclosed herein, e.g., FIGS. 4, 5, 8 and 9 are significant savings in power consumption, cost, printed circuit board space, and the number of modules or devices required. Heretofore achieving fine timing resolution required super high frequency clocks and very high speed counters, digital comparators, etc., that consume a great deal of power and generate a significant amount of heat. Not so with the present invention, as ultra-fine time resolution granularity is achieved for exact TDR touch locating with simple, low power mixed signal (analog and digital) circuits that are well adapted for use in battery powered electronic devices, e.g., personal digital assistants (PDA), touch screen of a tablet personal computer, touch screen plasma, light emitting diode (LED) and liquid crystal display (LCD) panels; equipment and appliance touch control panels, etc.

Figure 11:
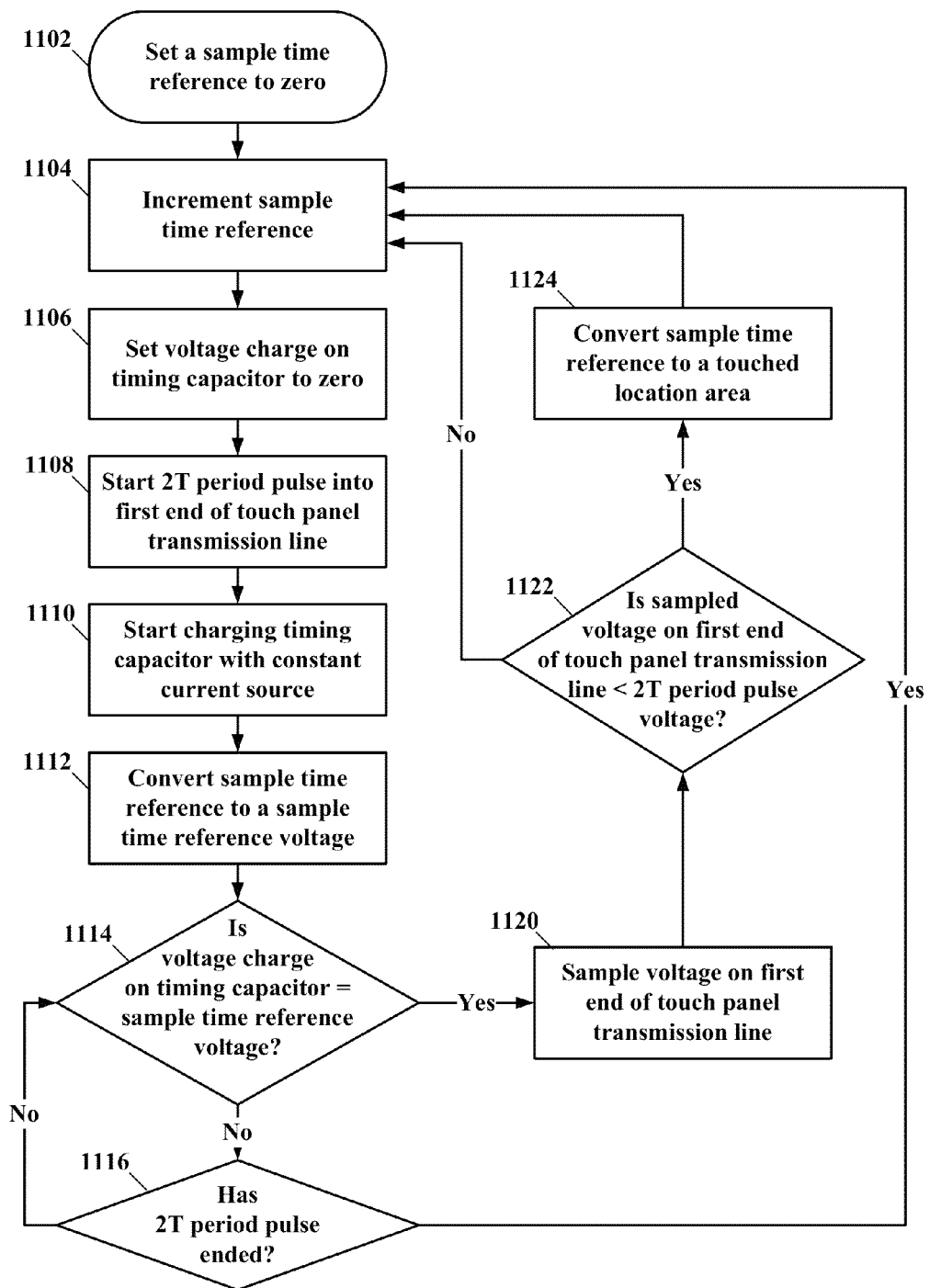
FIG. 11 illustrates a schematic process flow diagram of the operation of the touch panel system or touch screen shown in FIG. 1 for detecting and determining the locations of a plurality of touches, according to another specific example embodiment of this disclosure.

Referring to FIG. 11, depicted is a schematic process flow diagram of the operation of the touch panel system or touch screen shown in FIG. 1 for detecting and determining the locations of a plurality of touches, according to another specific example embodiment of this disclosure. In step 1102 a sample time reference is set to a zero value. In step 1104 the sample time reference value is incremented. In step 1106 any voltage charge on a timing capacitor is discharged to zero (0) volts. In step 1108 a pulse having a period of 2 T is applied to a first end of a touch panel transmission line. In step 1110 a constant current source starts charging the timing capacitor. In step 1112 the sample time reference value is converted to a sample time reference voltage.

Step 1114 determines when the voltage charge on the timing capacitor is equal to the sample time reference voltage, and when equal, the voltage on the first end of the touch panel transmission line is sampled and stored in step 1120. Step 1116 determines when the pulse having a period of 2 T has ended, and when the pulse has ended then step 1104 increments the present sample time reference value, and thereafter the subsequent steps continue. Step 1122 determines whether the voltage sampled on the first end of the touch panel transmission line is less than the pulse voltage amplitude, and if so, the sample time reference is converted to a touched location area. If not, then the present sample time reference value is incremented, and thereafter the subsequent steps continue. The touched location area may be saved in memory, displayed and/or communicated to another device (not shown).

Figure 12:
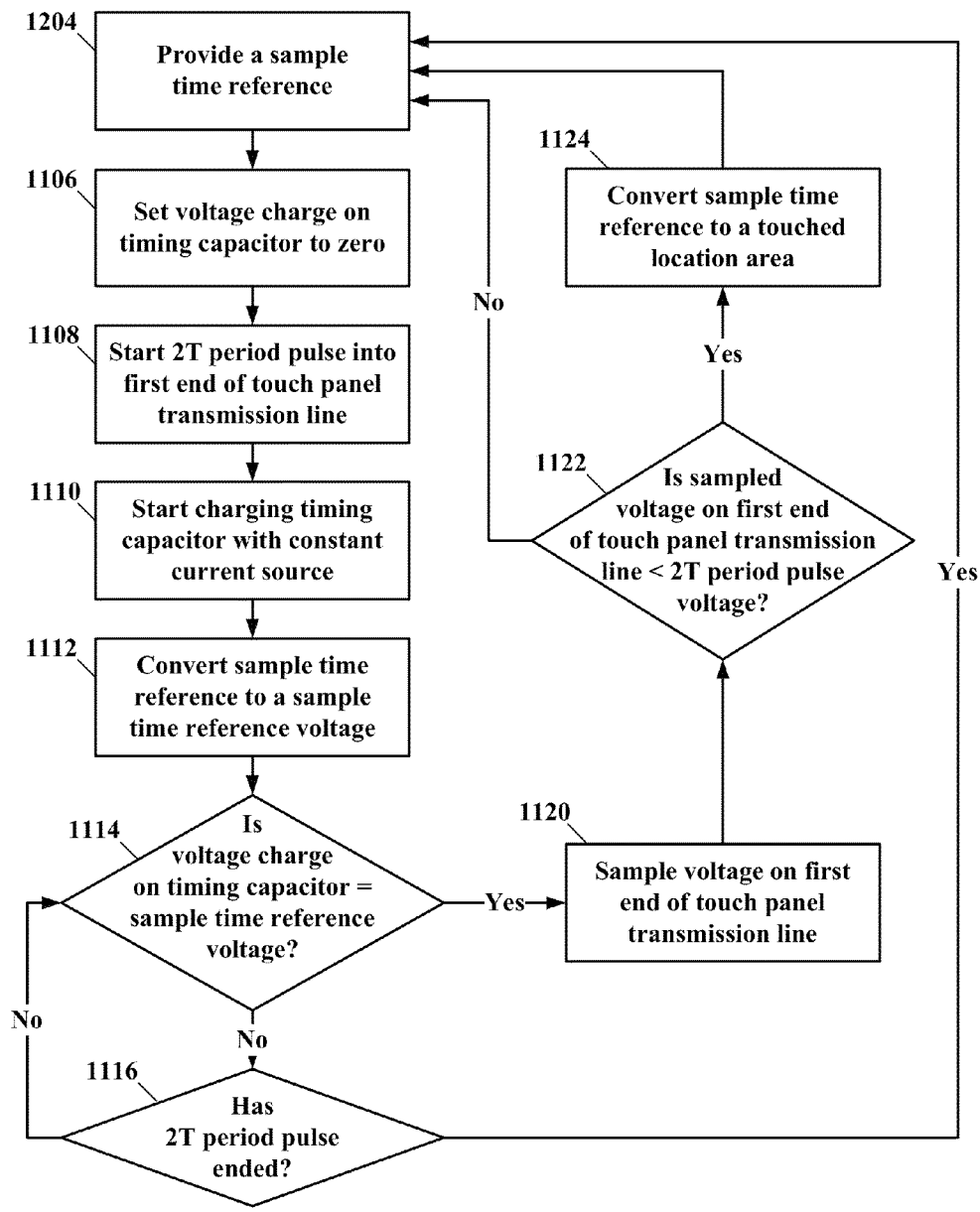
FIG. 12 illustrates a schematic process flow diagram of the operation of the touch panel system or touch screen shown in FIG. 1 for detecting and determining the locations of a plurality of touches, according to yet another specific example embodiment of this disclosure.

Referring to FIG. 12, depicted is a schematic process flow diagram of the operation of the touch panel system or touch screen shown in FIG. 1 for detecting and determining the locations of a plurality of touches, according to yet another specific example embodiment of this disclosure. The process flow diagram shown in FIG. 12 functions in substantially the same way as the flow diagram shown in FIG. 11 except that the sample time reference value may be set at any value and in any order. This allows a more narrow search of specific areas of the touch panel or screen, for faster acquisition of rapidly moving touches, etc. It is also contemplated and within the scope of this disclosure that repetitive pulses may be applied alternately to either end (i.e., first or second end) of the touch panel transmission line and respective voltage samples taken thereof based upon the sample time reference values.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for sensing touches to a substrate and determining location areas thereof, said method comprising the steps of:
   a) providing a sample time reference value;
   b) discharging any voltage charge on a timing capacitor to substantially zero volts;
   c) sending a pulse having a voltage amplitude to a first end of a serpentine transmission line fabricated on a substrate comprising a plurality of touch location areas;
   d) charging the timing capacitor with a constant current source;
   e) converting the sample time reference value to a sample time reference voltage;
   f) comparing the sample time reference voltage with a voltage charge on the timing capacitor, wherein
      if the sample time reference voltage and the voltage charge on the timing capacitor are substantially equal then storing the sample time reference value and a sample of a voltage at the first end of the serpentine transmission line then going to step h), and
      if the sample time reference voltage and the voltage charge on the timing capacitor are not substantially equal then going to step g)
   g) determining whether the pulse has ended, wherein
      if the pulse has ended then returning to step a), and
      if the pulse has not ended then returning to step f);
   h) determining whether the sampled voltage at the first end of the serpentine transmission line is less than the voltage amplitude of the pulse, wherein
      if not less than the voltage amplitude of the pulse then returning to step a), and
      if less than the voltage amplitude of the pulse then going to step i); and
   i) converting the stored sample time reference value to a location area on the substrate, then returning to step a).

2. The method according to claim 1, wherein the step of providing a sample time reference value comprises the step of incrementing the sample time reference value at each instance of the pulse ending.

3. The method according to claim 1, wherein the step of providing a sample time reference value comprises the step of incrementing the sample time reference value at each instance of a start of a new pulse.

4. The method according to claim 1, further comprising the steps of:
   alternating between asserting one pulse at the first end of the serpentine transmission line and then asserting a subsequent pulse at the second end of the serpentine transmission line; and
   storing the voltage sample from the first end of the serpentine transmission line when the pulse is asserted at the first end, and storing a subsequent voltage sample from the second end of the serpentine transmission line when the subsequent pulse is asserted at the second end.

5. The method according to claim 4, further comprising the step of averaging a location area corresponding to the voltage sample from the first end with a location area corresponding to the subsequent voltage sample from the second end for improving resolution of location areas touched on the substrate.

6. The method according to claim 1, wherein the step of comparing the sample time reference voltage with the voltage charge on the timing capacitor comprises the step of using a voltage comparator.

7. The method according to claim 1, wherein the step of determining whether the stored sample voltage at the first end of the serpentine transmission line is less than the voltage amplitude of the pulse comprises the steps of:
   converting the stored sample of the voltage at the first end to a digital value with an analog-to-digital converter (ADC); and
   comparing the digital value to a digital reference value with a digital comparator.

8. The method according to claim 1, wherein the step of converting the stored sample time reference value to a location area on the substrate that has been touched comprises the step of retrieving the location area corresponding to the stored sample time reference value with a look-up table having a plurality of sample time reference values and their corresponding location areas.

9. The method according to claim 1, further comprising the steps of:
storing a plurality of location areas that have been touched in a memory; and
calculating a Gaussian probability distribution of adjacent location areas from the plurality of location areas stored in the memory.

10. The method according to claim 1, further comprising the steps of:
storing a plurality of location areas that have been touched in a memory; and
averaging substantially similar location areas from the plurality of location areas stored in the memory.

11. The method according to claim 1, further comprising the steps of:
storing a plurality of location areas that have been touched in a memory; and
determining direction and speed of changing location areas from the plurality of location areas stored in the memory.

12. The method according to claim 1, wherein the substrate is a touch panel comprising a printed circuit board having the serpentine transmission line on a front printed circuit side thereof, and a back printed circuit side covered with an electrical conductor.

13. The method according to claim 1, wherein the substrate is a touch screen comprising a light transmissive insulating material having a front side with the serpentine transmission line thereon and a back side covered with a light transmissive electrical conductor.

14. An apparatus for sensing touches to a substrate and determining location areas thereof, comprising:
a charge time measurement unit (CTMU) comprising a timing capacitor and a constant current source;
a sample time reference source providing a sample time reference value;
a digital-to-analog converter (DAC) that converts the sample time reference value to a sample time reference voltage;
a voltage comparator having a first input coupled to an output of the DAC and a second input coupled to the timing capacitor of the CTMU;
a serpentine transmission line fabricated on a substrate comprising a plurality of touch location areas, the serpentine transmission line having first and second ends and a first voltage sensing node couple to the first end through a first resistor;
a pulse generator for generating a pulse at the first end of the serpentine transmission line, the pulse having a voltage amplitude;
a sample and hold circuit having an input coupled to the first end of the serpentine transmission line and a sample control input coupled to an output of the voltage comparator;
an analog-to-digital converter (ADC) having an input coupled to an output of the sample and hold circuit; and
a digital processor with memory, the digital processor is coupled to an output of the ADC;
wherein when a pulse from the pulse generator is asserted on the first end of the serpentine transmission line the constant current source is coupled to and starts charging the timing capacitor;
wherein
when a voltage charge on the timing capacitor is equal to the sample time reference voltage from the sample time reference voltage source,
the voltage comparator causes the sample and hold circuit to sample and hold a voltage on the first voltage sensing node of the serpentine transmission line;
wherein if the voltage sample taken at the first voltage sensing node of the serpentine transmission line is less than a reference voltage then the digital processor converts the sample time reference value to a location area of the substrate.

15. The apparatus according to claim 14, wherein a second end of the serpentine transmission line is terminated with a second resistor.

16. The apparatus according to claim 14, wherein a second end of the serpentine transmission line is not terminated.

17. The apparatus according to claim 14, further comprising: a multiplexer having a first input coupled to the first voltage sensing node, a second input coupled to a second voltage sensing node, and an output coupled to the input of the sample and hold circuit.

18. The apparatus according to claim 14, wherein the digital processor comprises a microcontroller.

19. The apparatus according to claim 14, wherein the substrate is a touch panel comprising a printed circuit board having the serpentine transmission line on a front printed circuit side thereof, and a back printed circuit side covered with an electrical conductor.

20. The apparatus according to claim 14, wherein the substrate is a touch screen comprising a light transmissive insulating material having a front side with the serpentine transmission line thereon and a back side covered with a light transmissive and electrically conductive material.

21. The apparatus according to claim 20, wherein the light transmissive and electrically conductive material is indium tin oxide (ITO).

22. The apparatus according to claim 20, further comprising a graphical display, the touch screen is located between the graphical display and a field of vision.

* * * * *